US012603839B2

(12) United States Patent
Zhang et al.

(10) Patent No.: US 12,603,839 B2
(45) Date of Patent: Apr. 14, 2026

(54) INTER-AUTONOMOUS SYSTEM (INTER-AS) OPTION

(71) Applicant: Juniper Networks, Inc., Sunnyvale, CA (US)

(72) Inventors: Zhaohui Zhang, Westford, MA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 281 days.

(21) Appl. No.: 18/341,439

(22) Filed: Jun. 26, 2023

(65) Prior Publication Data

US 2024/0430197 A1 Dec. 26, 2024

(51) Int. Cl.
*H04L 45/50* (2022.01)

(52) U.S. Cl.
CPC ..................................... *H04L 45/50* (2013.01)

(58) Field of Classification Search
None
See application file for complete search history.

(56) References Cited

U.S. PATENT DOCUMENTS 8,897,295 B2 * 11/2014 So ........................ H04L 41/0896
370/252
2006/0195607 A1 * 8/2006 Naseh .................. H04L 67/1006
709/238

2007/0110025 A1 * 5/2007 Guichard ............ H04L 63/0272
370/351
2011/0235545 A1 * 9/2011 Subramanian .......... H04L 45/04
370/254
2022/0311643 A1 * 9/2022 Chundu .............. H04L 12/4675

OTHER PUBLICATIONS

E. Rosen, et al.; "BGP/MPLS IP Virtual Private Networks (VPNs)"; Network Working Group; Standards Track; Feb. 2006; pp. 1-47; https://datatracker.ietf.org/doc/html/rfc4364.
Extended European Search Report for Application No. EP23193262 5 mailed on Jan. 30, 2024, 08 pages.
Rabadan, J, et al., "EVPN Inter-Domain Option-B Solution draft-rabadan-bess-evpn-inter-domain-opt-b-01," XP015159312, 2023, pp. 1-28.

* cited by examiner

*Primary Examiner* — Xavier S Wong
(74) *Attorney, Agent, or Firm* — Harrity & Harrity, LLP

(57) ABSTRACT

In some implementations, a network device may receive, from a first other network device, a route that includes a label, a prefix, and a next-hop identifier. The network device may generate, based on receiving the route, a composite tunnel attribute that includes an identifier of the network device and a label allocated by the network device. The network device may modify, based on generating the composite tunnel attribute, the route to cause the composite tunnel attribute to be included in the route. The network device may send, based on modifying the route, the route to a second other network device.

20 Claims, 9 Drawing Sheets

200

Network
220

Network
device
210-1

Network
device
210-N

500

510 Receive a route

520 Generate a composite tunnel attribute

530 Modify the route

540 Send the route

INTER-AUTONOMOUS SYSTEM (INTER-AS) OPTION

BACKGROUND

Border gateway protocol (BGP) is a standardized gateway protocol designed to exchange routing and reachability information among autonomous systems (ASs). BGP is classified as a path-vector routing protocol, and makes routing decisions based on paths, network policies, or rule sets configured by a network administrator. BGP used for routing within an AS is called interior BGP (iBGP), and BGP used for routing outside of the AS is called exterior BGP (eBGP).

SUMMARY

In some implementations, a method includes receiving, by a network device and from a first other network device, a route that includes a label, a prefix, and a next-hop identifier; generating, by the network device and based on receiving the route, a composite tunnel attribute that includes an identifier of the network device and a label allocated by the network device; modifying, by the network device and based on generating the composite tunnel attribute, the route to cause the composite tunnel attribute to be included in the route; and sending, by the network device and based on modifying the route, the route to a second other network device.

In some implementations, a non-transitory computer-readable medium storing a set of instructions includes one or more instructions that, when executed by one or more processors of a network device, cause the network device to: receive a route that includes a label, a prefix, and a next-hop identifier; modify, based on receiving the route, the route to cause a composite tunnel attribute to be included in the route, wherein the composite tunnel attribute includes an identifier of the network device and a label allocated by the network device; and send, based on modifying the route, the route to another network device.

In some implementations, a network device includes one or more memories; and one or more processors to: receive, from a first other network device, a route that includes a label, a prefix, and a next-hop identifier; modify the route to cause a composite tunnel attribute comprising a label allocated by the network device to be included in the route; and send, based on modifying the route, the route to another network device.

DETAILED DESCRIPTION

Figure 1A:
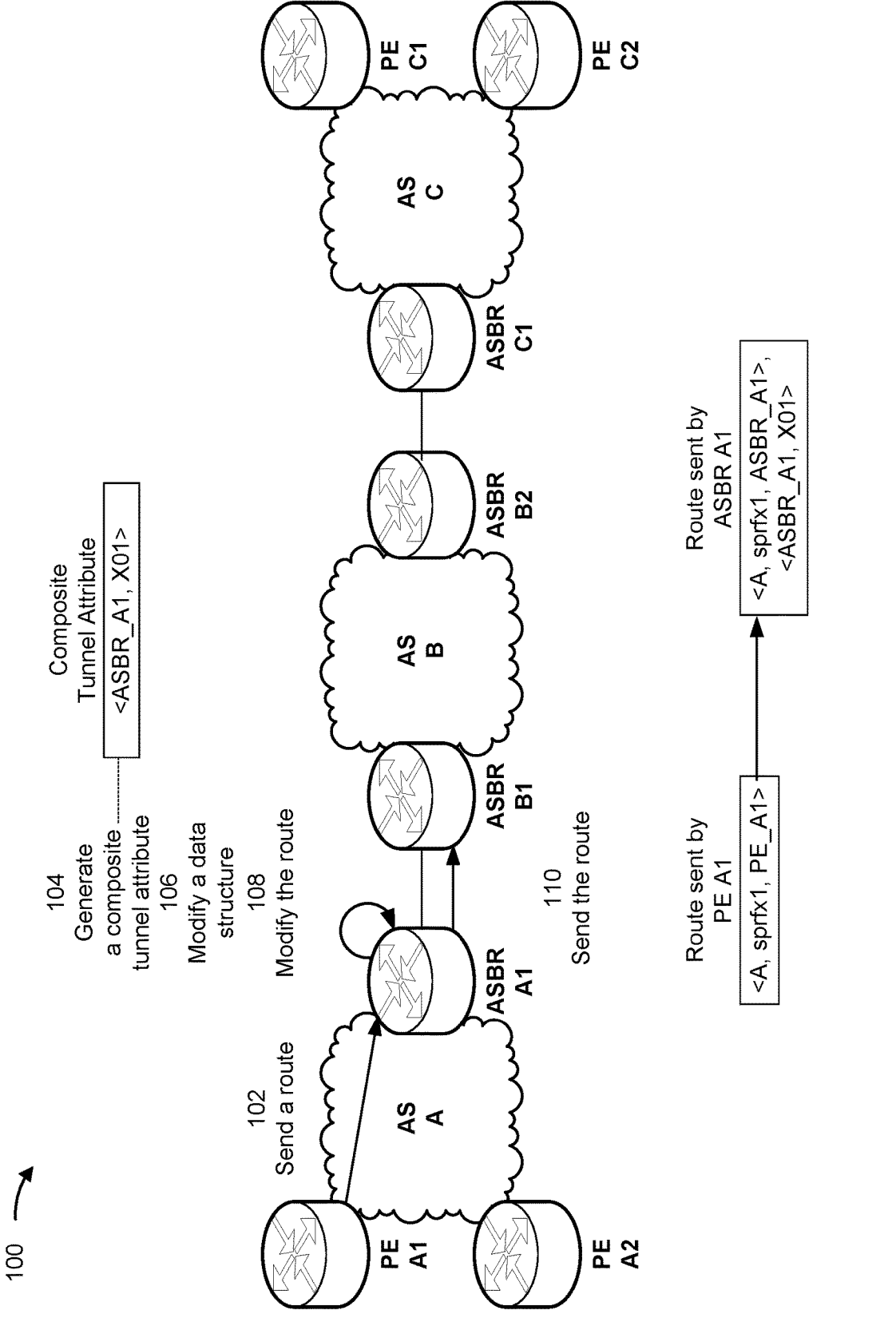
FIGS. 1A-1E are diagrams of an example implementation associated with an inter-AS option.

The following detailed description of example implementations refers to the accompanying drawings. The same reference numbers in different drawings may identify the same or similar elements.

An AS is a network, or a group of networks, that is controlled by a common administrator (e.g., an Internet provider (ISP)), and typically is associated with a single routing protocol, such as BGP. In some cases, a multiprotocol label switching (MPLS) virtual private network (VPN) can span multiple aSs by using an inter-AS functionality. Using such a functionality, an autonomous system border router (ASBR) re-advertises a route (e.g., that is received from another ASBR or a provider edge (PE)) to other ASBRs to facilitate establishment of a label switched path (LSP) (e.g., for a VPN) across the ASs.

In some cases, an ASBR can re-advertise a route with a next-hop field of the route changed to identify itself, and network layer reachability information (NLRI) of the route changed to indicate a label (e.g., that is locally allocated by ASBR). The ASBR also updates a forwarding state of the ASBR (e.g., a per-service-label forwarding state) that binds the label to original next-hop and label information that was included in the route. This enables the ASBR to route traffic associated with the label to a source that sent the route to the ASBR. This inter-AS option enables anonymity, such as by utilizing labels in the route (e.g., that prevents exposure of loopback addresses of PEs across ASs), but is difficult to implement at scale when hundreds, thousands, or more, of ASBRs are each utilizing different labels for routes across ASs. Alternatively, PEs can advertise routes with each other via route reflectors (RRs) and without involvement of ASBRs. PEs receive routes with respective next-hop fields unchanged, and LSPs are established for each next hop. An ASBR along an LSP can then forward the traffic based only on a PE label included in the traffic (e.g., that is associated with the LSP). This inter-AS option scales well, because traffic is routed based on PE labels, not individual allocated labels. However, this option lacks anonymity, because an AS's internal information (e.g., loopback addresses of PEs) can be shared outside the AS.

Some implementations described herein include a network device (e.g., an ASBR network device). The network device receives a route from another network device (e.g., a PE network device or another ASBR network device). The route includes a label (e.g., that is associated with a service, such as a VPN), a prefix (e.g., that is associated with one or more addresses, such as a range of Internet protocol (IP) addresses, associated with the service), and a next-hop identifier (e.g., that identifies an address, such as an IP address, of a PE network device when the PE network device sent the route to the network device; or a label that identifies another ASBR network device when the other ASBR network device sent the route to the network device). The route (e.g., when received from another ASBR network device) may also include a composite tunnel attribute (e.g., that includes an identifier of the other ASBR network device and a label allocated by the other ASBR network device). The network device, based on receiving the route, then generates another composite tunnel attribute (e.g., that includes an identifier of the network device and a label allocated by the network device).

The network device then modifies a data structure (e.g., associated with a forwarding state of the network device) to indicate an association between the label allocated by the network device and one of the next-hop identifier included in the route (e.g., when the network device received the route from a PE network device) or an egress endpoint of the composite tunnel attribute included in the route (e.g., when the network device received the route from another ASBR network device). Further, the network device modifies the route to cause the identifier of the network device to be indicated by the next-hop identifier of the route, and to cause the other composite tunnel attribute (e.g., that was generated by the network device) to be included in the route. The network device then sends the route to another network device (e.g., to another ASBR network device or to another PE network device).

Accordingly, traffic that is destined for the PE device (e.g., that originated the route) is routed to the network device (e.g., as a hop along the LSP to the PE device). The traffic includes the identifier of the network device, the label allocated by the network device, and the label. Accordingly, the network device searches, based on the allocated label, to identify the composite tunnel attribute (e.g., that was included in the route when the route was received from another ASBR network device) or the next-hop identifier (e.g., that was included in the route when the route was received from the PE network device). When the network device identifies the composite tunnel attribute, the network device modifies the traffic to include at least a portion of the composite tunnel attribute, such as the identifier of the other ASBR network device and the label allocated by the other ASBR network device. Alternatively, when the network device identifies the next-hop identifier, the network device modifies the traffic to include the next-hop identifier. In each way, the network device modifies the traffic to ensure that the traffic is routed to a next hop on the LSP to the PE network device, or is routed to the PE network device.

Accordingly, some implementations described herein provide an inter-AS option (e.g., that allows for routes and traffic to be routed across multiple ASs). Further, some implementations enable anonymity. For example, each ASBR network device may modify a route to include updated next-hop information and a new composite tunnel attribute, which therefore hides an address (e.g., a loopback address) of a PE network device that originated the route from other devices outside of an AS associated with the PE network device. Additionally, some implementations provide improved scalability (e.g., as compared to some existing inter-AS options). For example, the label of the route does not need to be modified when the route is re-advertised, and therefore per-service-label forwarding states do not have to be maintained and used by ASBR network devices to route traffic destined for the PE network device. This conserves computing resources (e.g., processing resources, memory resources, communication resources, and/or power resources, among other examples) of the ASBR network devices and facilitates an improved performance (e.g., an improved routing performance) of the ASBR network devices. Further, some implementations enable anonymity and an improved scalability at a same time, which is not possible using existing inter-AS options.

FIGS. 1A-1E are diagrams of an example implementation 100 associated with an inter-AS option. As shown in FIGS. 1A-1E, example implementation 100 includes a plurality of network devices, such as a plurality of PE network devices and a plurality of ASBR network devices. These devices are described in more detail below in connection with FIGS. 2-4.

As shown in FIGS. 1A-1E, example implementation 100 may include a plurality of ASs, shown as AS A, AS B, and AS C. Each AS may be associated with one or more network devices. For example, AS A may be associated with a PE network device A1 ("PE A1"), a PE network device A2 ("PE A2"), and an ASBR network device A1 ("ASBR A1"); AS B may be associated with an ASBR network device B1 ("ASBR B1" and an ASBR network device B2 ("ASBR B2"); and AS C may be associated with a PE network device C1 ("PE C1"), a PE network device C2 ("PE C2"), and an ASBR network device C1 (ASBR "C1").

As shown by reference number 102, the PE A1 may send a route (e.g., a service route) to the ASBR A1. For example, the PE A1 may send the route to the ASBR A1 to distribute the route to other network devices, such as other ASBR network devices and/or other PE network devices, and thereby facilitate proper routing of traffic associated with a service, such as VPN (e.g., that spans one or more ASs), across AS boundaries. Accordingly, the ASBR A1 may receive the route from the PE A1 (e.g., as a result of the PE A1 sending the route). The route may include, for example, a label (e.g., that is associated with the service), a prefix (e.g., that is associated with one or more addresses, such as a range of IP addresses, associated with the service), and a next-hop identifier (e.g., that identifies an address, such as an IP address, of the PE A1 as a next-hop to which traffic should be forwarded). As a specific example, as shown in FIG. 1A, the route may be a tuple <A, sprfx1, PE A1>, where A is a label, sprfx1 is a prefix, and PE_A1 is a next-hop identifier. In some implementations, the route may also include a non-composite tunnel identifier (e.g., that identifies one or more non-composite tunnels associated with the PE A1).

As shown by reference number 104, the ASBR A1 may generate a composite tunnel attribute (e.g., based on receiving the route from the PE A1). The composite tunnel attribute may be, for example, a tunnel encapsulation attribute (TEA) (e.g., as described in Internet Engineering Task Force (IETF) Request for Comments (RFC) 9012). The composite tunnel attribute may indicate a label switched path (LSP) to the PE A1 (e.g., via the ASBR A1). For example, the composite tunnel attribute may include an identifier of the ASBR A1 and/or a label allocated by the ASBR A1 (e.g., that is associated with the next-hop identifier or the non-composite tunnel identifier), among other examples. As a specific example, as shown in FIG. 1A, the composite tunnel attribute may be a tuple <ASBR_A1, X01>, where ASBR_A1 is an identifier of the ASBR A1 (e.g., an identifier that indicates the ASBR A1, such as an egress endpoint of the composite tunnel attribute), and X01 is a label allocated by the ASBR A1 (e.g., a binding label that identifies, for example, the composite tunnel attribute as bound to the next-hop identifier PE_A1).

As shown by reference number 106, the ASBR A1 may modify a data structure (e.g., based on receiving the route from the PE A1 and/or generating the composite tunnel attribute). The data structure may be included in, and/or be accessible to, the ASBR A1, and may be a forwarding table, a forwarding information base (FIB), a forwarding context, and/or a similar data structure. In some implementations, the ASBR A1 may modify the data structure to indicate an association between the label allocated by the ASBR A1 and the next-hop identifier (e.g., that is included in the route) or the non-composite tunnel identifier (e.g., that is included in the route). For example, the ASBR A1 may modify the data structure to include an entry that includes the next-hop identifier (e.g., PE_A1) and that is keyed to the label allocated by the ASBR A1 (e.g., X01). In this way, the ASBR A1 may create a forwarding state for the allocated label (e.g., to enable traffic that includes the allocated label to be tunneled to the next-hop identifier or the non-composite tunnel identifier).

As shown by reference number 108, the ASBR A1 may modify the route. In some implementations, the ASBR A1 may modify the route to cause the identifier of the ASBR A1 to be indicated by the next-hop identifier of the route. That is, the ASBR A1 may modify the route to cause the next-hop identifier to indicate only the ASBR A1 (e.g., to cause the next-hop identifier to be ASBR_A1). In some implementations, the ASBR A1 may modify the route to cause the composite tunnel attribute to be included in the route (e.g., to append the composite tunnel attribute to the route). In a specific example, the ASBR A1 may modify the route to be a first tuple and a second tuple (that are separated by a comma), such as, as shown in FIG. 1A, <A, sprfx1, ASBR_A1>, <ASBR_A1, X01>, where the first tuple includes the label, the prefix, and the next-hop identifier (e.g., after being updated to indicate the ASBR A1), and the second tuple includes the composite tunnel attribute (e.g., that includes the identifier of the ASBR A1 and/or the label allocated by the ASBR A1).

As shown by reference number 110, the ASBR A1 may send the route to the ASBR B1 (e.g., based on modifying the route). For example, the ASBR A1 may send the route to the ASBR B1 as part of a re-advertising process to distribute the route to other network devices (e.g., other ASBR network devices) connected to the ASBR A1 that are not associated with the AS A. Accordingly, the ASBR B1 may receive the route from the ASBR A1 (e.g., as a result of the ASBR A1 sending the route).

Figure 1B:
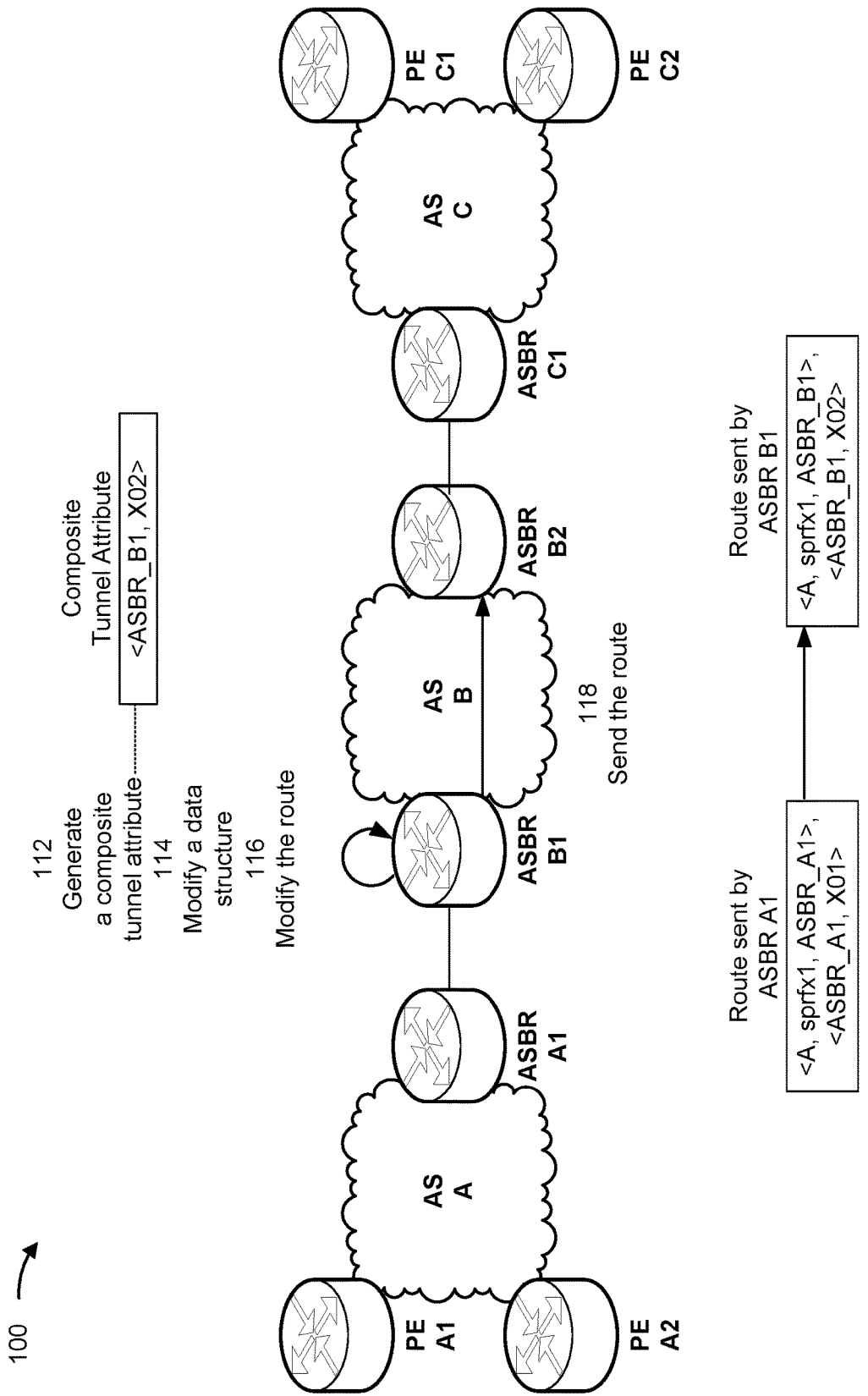

As shown in FIG. 1B, and by reference number 112, the ASBR B1 may generate a composite tunnel attribute (e.g., based on receiving the route from the ASBR A1), such as a TEA. The composite tunnel attribute may indicate an LSP to the PE A1 (e.g., via the ASBR B1). For example, the composite tunnel attribute may include an identifier of the ASBR B1 and/or a label allocated by the ASBR B1 (e.g., that is associated with the composite tunnel attribute included in the route), among other examples. As a specific example, as shown in FIG. 1B, the composite tunnel attribute may be a tuple <ASBR_B1, X02>, where ASBR_B1 is an identifier of the ASBR B1 (e.g., an identifier that indicates the ASBR B1, such as an egress endpoint of the composite tunnel attribute), and X02 is a label allocated by the ASBR B1 (e.g., a binding label that identifies, for example, the composite tunnel attribute as bound to the composite tunnel attribute <ASBR_A1, X01>).

As shown by reference number 114, the ASBR B1 may modify a data structure (e.g., based on receiving the route from the ASBR A1 and/or generating the composite tunnel attribute). The data structure may be included in, and/or accessible to, the ASBR B1, and may be a forwarding table, a FIB, a forwarding context, and/or a similar data structure. In some implementations, because the route includes a composite tunnel attribute (also referred to as "another composite tunnel attribute") when received by the ASBR B1, the ASBR B1 may modify the data structure to indicate an association between the label allocated by the ASBR B1 and the other composite tunnel attribute. For, example, the ASBR B1 may modify the data structure to include an entry that includes the other composite tunnel attribute that is included in the route (e.g., <ASBR_A1, X01>) and that is keyed to the label allocated by the ASBR B1 (e.g., X02). In this way, the ASBR B1 may create a forwarding state for the allocated label (e.g., to enable traffic that includes the allocated label to be tunneled to an egress point of the other composite tunnel attribute).

As shown by reference number 116, the ASBR B1 may modify the route (e.g., based on updating the data structure). In some implementations, the ASBR B1 may modify the route to cause the identifier of the ASBR B1 to be indicated by the next-hop identifier of the route. That is, the ASBR B1 may modify the route to cause the next-hop identifier to indicate only the ASBR B1 (e.g., to cause the next-hop identifier to be ASBR_B1). In some implementations, the ASBR B1 may modify the route to cause the composite tunnel attribute to be included in the route (e.g., to remove the other composite tunnel attribute included in the route, and to thereafter include the composite tunnel attribute in the route). In a specific example, the ASBR B1 may modify the route to be a first tuple and a second tuple (that are separated by a comma), such as, as shown in FIG. 1B, <A, sprfx1, ASBR_B1>, <ASBR_B1, X02>, where the first tuple includes the label, the prefix, and the next-hop identifier (e.g., after being updated to indicate the ASBR B1), and the second tuple includes the composite tunnel attribute (e.g., that includes the identifier of the ASBR B1 and/or the label allocated by the ASBR B1).

As shown by reference number 118, the ASBR B1 may send the route to the ASBR B2 (e.g., based on modifying the route). For example, the ASBR B1 may send the route to the ASBR B2 as part of a re-advertising process to distribute the route to other network devices (e.g., other ASBR network devices) connected to the ASBR B1 that are associated with the AS B. Accordingly, the ASBR B2 may receive the route from the ASBR B1 (e.g., as a result of the ASBR B1 sending the route).

Figure 1C:
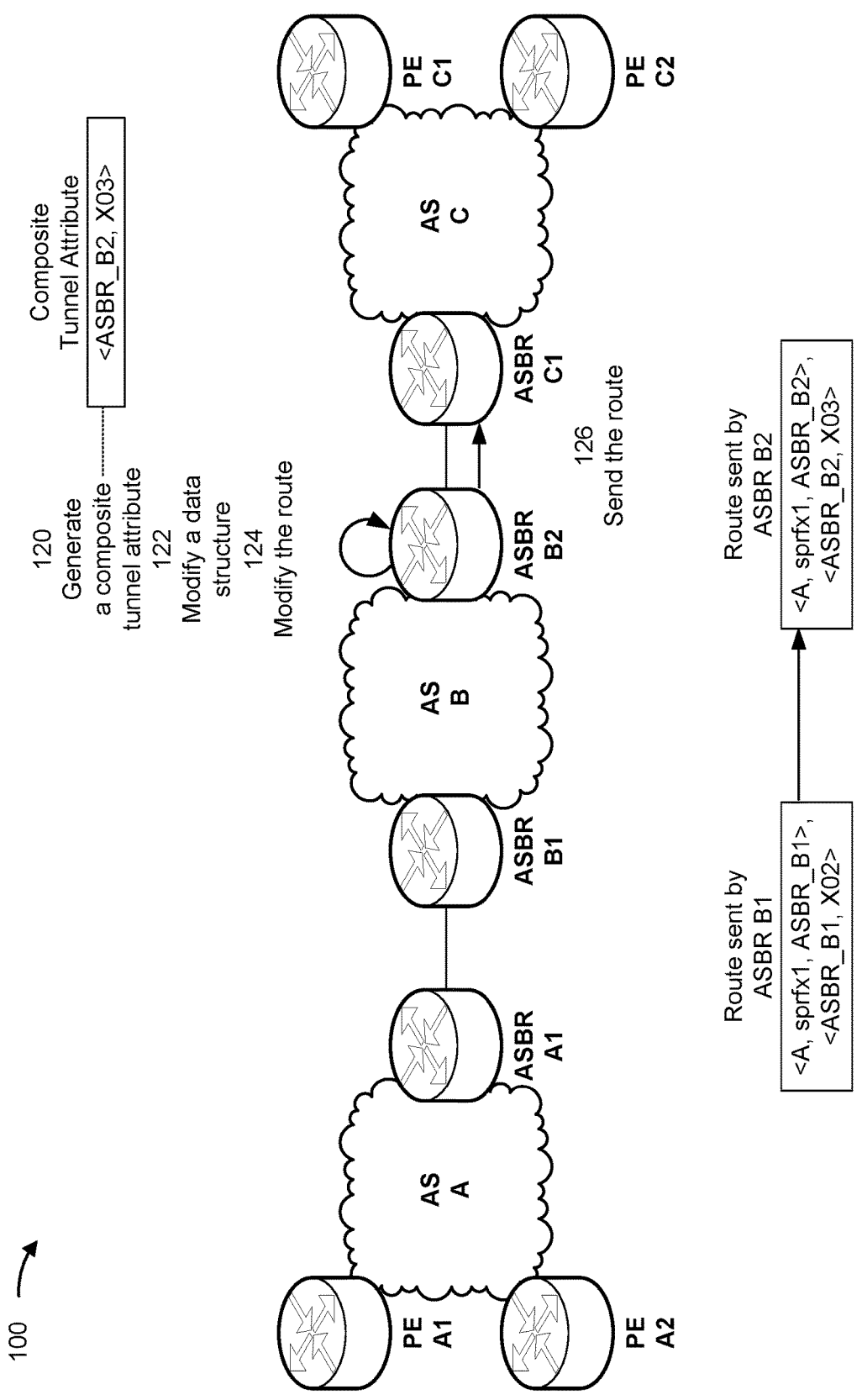

As shown in FIG. 1C, and by reference number 120, the ASBR B2 may generate a composite tunnel attribute (e.g., based on receiving the route from the ASBR B1), such as a TEA. The composite tunnel attribute may indicate an LSP to the PE A1 (e.g., via the ASBR B2). For example, the composite tunnel attribute may include an identifier of the ASBR B2 and/or a label allocated by the ASBR B2 (e.g., that is associated with the composite tunnel attribute included in the route), among other examples. As a specific example, as shown in FIG. 1C, the composite tunnel attribute may be a tuple <ASBR_B2, X03>, where ASBR_B2 is an identifier of the ASBR B2 (e.g., an identifier that indicates the ASBR B2, such as an egress endpoint of the composite tunnel attribute), and X03 is a label allocated by the ASBR B2 (e.g., a binding label that identifies, for example, the composite tunnel attribute as bound to the composite tunnel attribute <ASBR_B1, X02>).

As shown by reference number 122, the ASBR B2 may modify a data structure (e.g., based on receiving the route from the ASBR B1 and/or generating the composite tunnel attribute). The data structure may be included in, and/or accessible to, the ASBR B2, and may be a forwarding table, a FIB, a forwarding context, and/or a similar data structure. In some implementations, because the route includes a composite tunnel attribute (also referred to as "another composite tunnel attribute") when received by the ASBR B2, the ASBR B2 may modify the data structure to indicate an association between the label allocated by the ASBR B2 and the other composite tunnel attribute. For, example, the ASBR B2 may modify the data structure to include an entry that includes the other composite tunnel attribute that is included in the route (e.g., <ASBR_B1, X02>) and that is keyed to the label allocated by the ASBR B2 (e.g., X03). In this way, the ASBR B2 may create a forwarding state for the allocated label (e.g., to enable traffic that includes the allocated label to be tunneled to an egress point of the other composite tunnel attribute).

As shown by reference number 124, the ASBR B2 may modify the route (e.g., based on updating the data structure). In some implementations, the ASBR B2 may modify the route to cause the identifier of the ASBR B2 to be indicated by the next-hop identifier of the route. That is, the ASBR B2 may modify the route to cause the next-hop identifier to indicate only the ASBR B2 (e.g., to cause the next-hop identifier to be ASBR_B2). In some implementations, the ASBR B2 may modify the route to cause the composite tunnel attribute to be included in the route (e.g., to remove the other composite tunnel attribute included in the route, and to thereafter include the composite tunnel attribute in the route). In a specific example, the ASBR B2 may modify the route to be a first tuple and a second tuple (that are separated by a comma), such as, as shown in FIG. 1C, <A, sprfx1, ASBR_B2>, <ASBR_B2, X03>, where the first tuple includes the label, the prefix, and the next-hop identifier (e.g., after being updated to indicate the ASBR B2), and the second tuple includes the composite tunnel attribute (e.g., that includes the identifier of the ASBR B2 and/or the label allocated by the ASBR B2).

As shown by reference number 126, the ASBR B2 may send the route to the ASBR C1 (e.g., based on modifying the route). For example, the ASBR B2 may send the route to the ASBR C1 as part of a re-advertising process to distribute the route to other network devices (e.g., other ASBR network devices) connected to the ASBR B2 that are associated with another AS (e.g., the AS C). Accordingly, the ASBR C1 may receive the route from the ASBR B2 (e.g., as a result of the ASBR B2 sending the route).

Figure 1D:
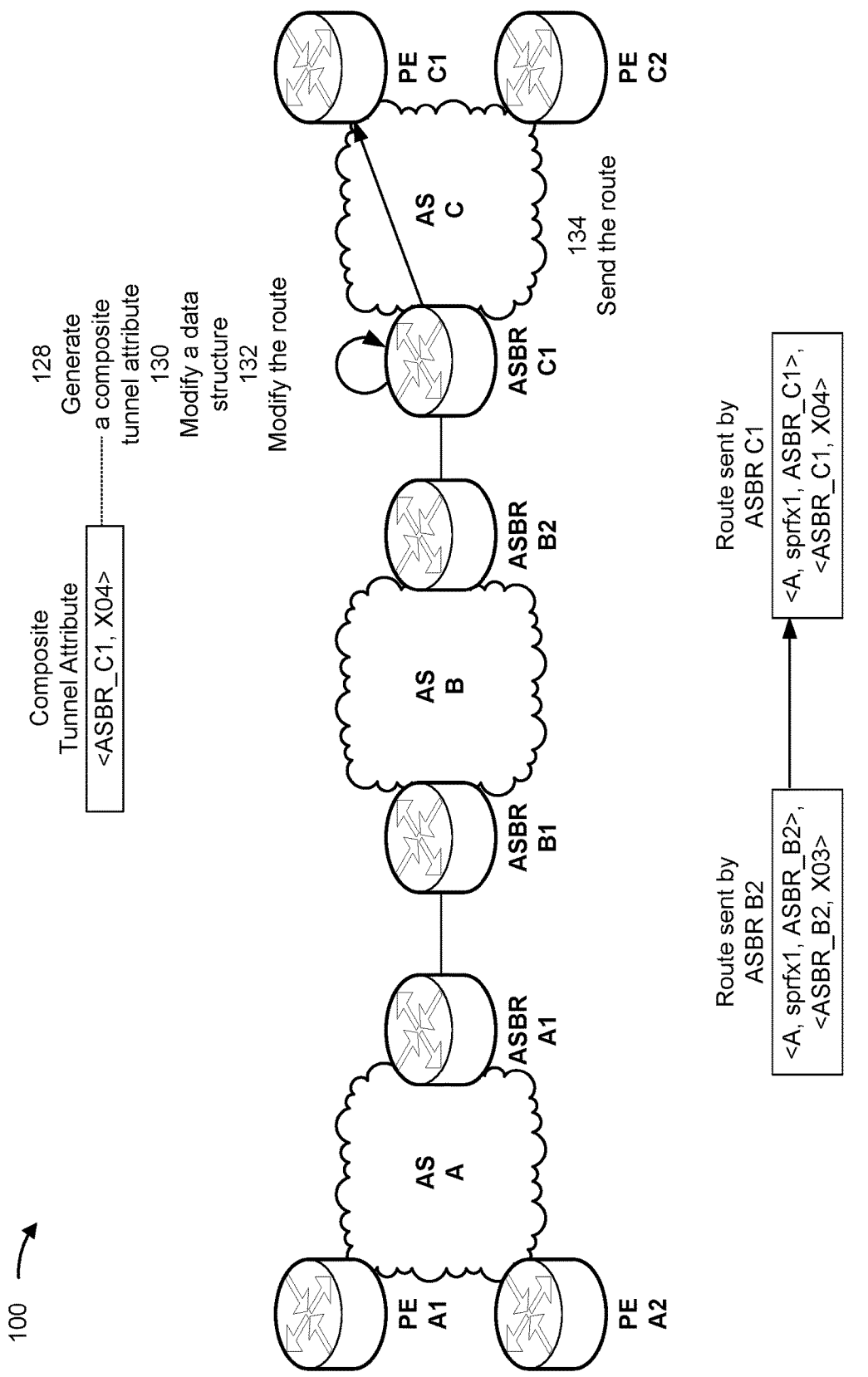

As shown in FIG. 1D, and by reference number 128, the ASBR C1 may generate a composite tunnel attribute (e.g., based on receiving the route from the ASBR B2), such as a TEA. The composite tunnel attribute may indicate an LSP to the PE A1 (e.g., via the ASBR C1). For example, the composite tunnel attribute may include an identifier of the ASBR C1 and/or a label allocated by the ASBR C1 (e.g., that is associated with the composite tunnel attribute included in the route), among other examples. As a specific example, as shown in FIG. 1D, the composite tunnel attribute may be a tuple <ASBR_C1, X04>, where ASBR_C1 is an identifier of the ASBR C1 (e.g., an identifier that indicates the ASBR C1, such as an egress endpoint of the composite tunnel attribute), and X04 is a label allocated by the ASBR C1 (e.g., a binding label that identifies, for example, the composite tunnel attribute as bound to the composite tunnel attribute <ASBR_B2, X03>).

As shown by reference number 130, the ASBR C1 may modify a data structure (e.g., based on receiving the route from the ASBR B2 and/or generating the composite tunnel attribute). The data structure may be included in, and/or be accessible to, the ASBR C1, and may be a forwarding table, a FIB, a forwarding context, and/or a similar data structure. In some implementations, because the route includes a composite tunnel attribute (also referred to as "another composite tunnel attribute") when received by the ASBR C1, the ASBR C1 may modify the data structure to indicate an association between the label allocated by the ASBR C1 and the other composite tunnel attribute. For, example, the ASBR C1 may modify the data structure to include an entry that includes the other composite tunnel attribute that is included in the route (e.g., <ASBR_B2, X03>) and that is keyed to the label allocated by the ASBR C1 (e.g., X04). In this way, the ASBR C1 may create a forwarding state for the allocated label (e.g., to enable traffic that includes the allocated label to be tunneled to an egress point of the other composite tunnel attribute).

As shown by reference number 132, the ASBR C1 may modify the route (e.g., based on updating the data structure). In some implementations, the ASBR C1 may modify the route to cause the identifier of the ASBR C1 to be indicated by the next-hop identifier of the route. That is, the ASBR C1 may modify the route to cause the next-hop identifier to indicate only the ASBR C1 (e.g., to cause the next-hop identifier to be ASBR_C1). In some implementations, the ASBR C1 may modify the route to cause the composite tunnel attribute to be included in the route (e.g., to remove the other composite tunnel attribute included in the route, and to thereafter include the composite tunnel attribute in the route). In a specific example, the ASBR C1 may modify the route to be a first tuple and a second tuple (that are separated by a comma), such as, as shown in FIG. 1D, <A, sprfx1, ASBR_C1>, <ASBR_C1, X04>, where the first tuple includes the label, the prefix, and the next-hop identifier (e.g., after being updated to indicate the ASBR C1), and the second tuple includes the composite tunnel attribute (e.g., that includes the the identifier of the ASBR C1 and/or the label allocated by the ASBR C1).

As shown by reference number 134, the ASBR C1 may send the route to the PE C1 (e.g., based on modifying the route). For example, the ASBR C1 may send the route to the PE C1 as part of a re-advertising process to distribute the route to other network devices (e.g., other PE network devices) connected to the ASBR C1 that are associated with the AS C. Accordingly, the PE C1 may receive the route from the ASBR C1 (e.g., as a result of the ASBR C1 sending the route).

In some implementations, as described herein in relation to FIGS. 1A-1D, a network device (e.g., a PE network device or an ASBR network device) may directly send a route to another network device (e.g., another PE network device or another ASBR network device), such as via a link between the network device and the other network device. Additionally, or alternatively, as described herein in relation to FIGS. 1A-1D, a network device (e.g., a PE network device or an ASBR network device) may indirectly send a route to another network device (e.g., another PE network device or another ASBR network device), such as via one or more RRs disposed between the network device and the other network device.

Figure 1E:
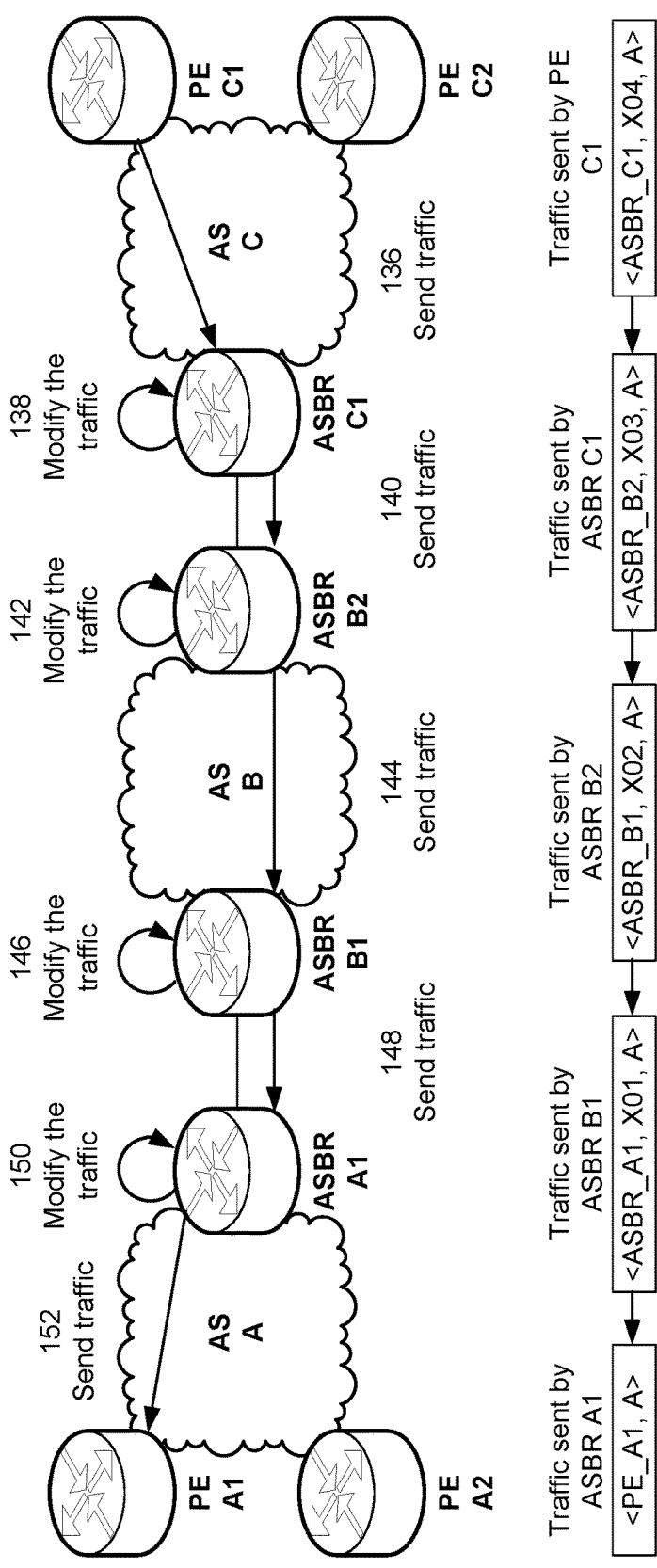

As shown in FIG. 1E, and by reference number 136, the PE C1 may send traffic (e.g., that is associated with the service) that is destined for the PE A1. Accordingly, the PE C1 may send the traffic to the ASBR C1 (e.g., as an initial hop along an LSP to the PE A1). In this way, the ASBR C1 may receive the traffic from the PE C1 (e.g., as a result of the PE C1 sending the traffic). The traffic may include (e.g., in a header of one or more packets of the traffic) the identifier of the ASBR C1, the label allocated by the ASBR C1, and the label (e.g., that is associated with the service), which were included in the route that the ASBR C1 sent to PE C1. For example, as shown in FIG. 1E, the traffic may include a tuple <ASBR_C1, X04, A>, where ASBR_C1 is identifier of the ASBR C1, X04 is the label allocated by the ASBR C1, and A is the label.

As shown by reference number 138, the ASBR C1 may modify the traffic (e.g., to allow the traffic to be forwarded to the PE A1 via the LSP). Accordingly, the ASBR C1 may modify the traffic to allow the traffic to be forwarded to the ASBR B2. For example, the ASBR C1 may modify the traffic to cause the identifier of the ASBR B2 and the label allocated by the ASBR B2 to be included in the traffic (and for the identifier of the ASBR C1 and the label allocated by the ASBR C1 to be removed from the traffic). As a specific example, as shown in FIG. 1E, the ASBR C1 may modify the traffic to cause the traffic to include a tuple <ASBR_B2, X03, A>, where ASBR_B2 is the identifier of the ASBR B2, X03 is the label allocated by the ASBR B2, and A is the label.

In some implementations, to modify the traffic, the ASBR C1 may identify information in the data structure (e.g., that is included in, and/or accessible to, the ASBR C1), and may modify the traffic based on the information. For example, the ASBR C1 may search, based on the label allocated by the ASBR C1 that is included in the traffic (e.g., X04), to identify an entry (e.g., that is keyed to the label allocated by the ASBR C1). The ASBR C1 may process (e.g., parse and/or read) the entry to identify the composite tunnel attribute that was generated by the ASBR B2 and that is included in the entry. Accordingly, the ASBR C1 may modify the traffic to cause at least a portion of the composite tunnel attribute that was generated by the ASBR B2 (e.g., <ASBR_B2, X03>) to be included in the traffic (e.g., cause the identifier of the ASBR B2 and the label allocated by the ASBR B2, which are included in the composite tunnel attribute that was generated by the ASBR B2, to be included in the traffic). The ASBR C1 may also modify the traffic to cause the identifier of the ASBR C1 and the label allocated by the ASBR C1 (e.g., that are included in the traffic when received by the ASBR C1) to be removed from the traffic.

As shown by reference number 140, the ASBR C1 may send the traffic to the ASBR B2 (e.g., as a next hop along the LSP to the PE A1). In this way, the ASBR B2 may receive the traffic from the ASBR C1 (e.g., as a result of the ASBR C1 sending the traffic).

As shown by reference number 142, the ASBR B2 may modify the traffic (e.g., to allow the traffic to be forwarded to the PE A1 via the LSP). Accordingly, the ASBR B2 may modify the traffic to allow the traffic to be forwarded to the ASBR B1. For example, the ASBR B2 may modify the traffic to cause the identifier of the ASBR B1 and the label allocated by the ASBR B1 to be included in the traffic (and for the identifier of the ASBR B2 and the label allocated by the ASBR B2 to be removed from the traffic). As a specific example, as shown in FIG. 1E, the ASBR B2 may modify the traffic to cause the traffic to include a tuple <ASBR_B1, X02, A>, where ASBR_B1 is the identifier of the ASBR B1, X02 is the label allocated by the ASBR B1, and A is the label.

In some implementations, to modify the traffic, the ASBR B2 may identify information in the data structure (e.g., that is included in, and/or accessible to, the ASBR B2), and may modify the traffic based on the information. For example, the ASBR B2 may search, based on the label allocated by the ASBR B2 that is included in the traffic (e.g., X03), to identify an entry (e.g., that is keyed to the label allocated by the ASBR B2). The ASBR B2 may process (e.g., parse and/or read) the entry to identify the composite tunnel attribute that was generated by the ASBR B1 and that is included in the entry. Accordingly, the ASBR B2 may modify the traffic to cause at least a portion of the composite tunnel attribute that was generated by the ASBR B1 (e.g., <ASBR_B1, X02>) to be included in the traffic (e.g., cause the identifier of the ASBR B1 and the label allocated by the ASBR B1, which are included in the composite tunnel attribute that was generated by the ASBR B1, to be included in the traffic). The ASBR B2 may also modify the traffic to cause the identifier of the ASBR B2 and the label allocated by the ASBR B2 (e.g., that are included in the traffic when received by the ASBR B2) to be removed from the traffic.

As shown by reference number 144, the ASBR B2 may send the traffic to the ASBR B1 (e.g., as a next hop along the LSP to the PE A1). In this way, the ASBR B1 may receive the traffic from the ASBR B2 (e.g., as a result of the ASBR B2 sending the traffic).

As shown by reference number 146, the ASBR B1 may modify the traffic (e.g., to allow the traffic to be forwarded to the PE A1 via the LSP). Accordingly, the ASBR B1 may modify the traffic to allow the traffic to be forwarded to the ASBR A1. For example, the ASBR B1 may modify the traffic to cause the identifier of the ASBR A1 and the label allocated by the ASBR A1 to be included in the traffic (and for the identifier of the ASBR B1 and the label allocated by the ASBR B1 to be removed from the traffic). As a specific example, as shown in FIG. 1E, the ASBR B1 may modify the traffic to cause the traffic to include a tuple <ASBR_A1, X01, A>, where ASBR_A1 is the identifier of the ASBR A1, X01 is the label allocated by the ASBR A1, and A is the label.

In some implementations, to modify the traffic, the ASBR B1 may identify information in the data structure (e.g., that is included in, and/or accessible to, the ASBR B1), and may modify the traffic based on the information. For example, the ASBR B1 may search, based on the label allocated by the ASBR B1 that is included in the traffic (e.g., X02), to identify an entry (e.g., that is keyed to the label allocated by the ASBR B1). The ASBR B1 may process (e.g., parse and/or read) the entry to identify the composite tunnel attribute that was generated by the ASBR A1 and that is included in the entry. Accordingly, the ASBR B1 may modify the traffic to cause at least a portion of the composite tunnel attribute that was generated by the ASBR A1 (e.g., <ASBR_A1, X01>) to be included in the traffic (e.g., cause the identifier of the ASBR A1 and the label allocated by the ASBR A1, which are included in the composite tunnel attribute that was generated by the ASBR A1, to be included in the traffic). The ASBR B1 may also modify the traffic to cause the identifier of the ASBR B1 and the label allocated by the ASBR B1 (e.g., that are included in the traffic when received by the ASBR B1) to be removed from the traffic.

As shown by reference number 148, the ASBR B1 may send the traffic to the ASBR A1 (e.g., as a next hop along the LSP to the PE A1). In this way, the ASBR A1 may receive the traffic from the ASBR B1 (e.g., as a result of the ASBR B1 sending the traffic).

As shown by reference number 150, the ASBR A1 may modify the traffic (e.g., to allow the traffic to be forwarded to the PE A1 via the LSP). Accordingly, the ASBR A1 may modify the traffic to allow the traffic to be forwarded to the PE A1. For example, the ASBR A1 may modify the traffic to cause the identifier of the PE A1 (e.g., that identifies an address, such as an IP address, of the PE A1) to be included in the traffic (and for the identifier of the ASBR A1 and the label allocated by the ASBR A1 to be removed from the traffic). As a specific example, as shown in FIG. 1E, the ASBR A1 may modify the traffic to cause the traffic to include a tuple <PE_A1, A>, where PE_A1 is the identifier associated with the PE A1, and A is the label.

In some implementations, to modify the traffic, the ASBR A1 may identify information in the data structure (e.g., that is included in, and/or accessible to, the ASBR A1), and may modify the traffic based on the information. For example, the ASBR A1 may search, based on the label allocated by the ASBR A1 that is included in the traffic (e.g., X01), to identify an entry (e.g., that is keyed to the label allocated by the ASBR A1). The ASBR A1 may process (e.g., parse and/or read) the entry to identify the identifier of the PE A1 that is included in the entry. Accordingly, the ASBR A1 may modify the traffic to cause the identifier of the PE A1 to be included in the traffic. The ASBR A1 may also modify the traffic to cause the identifier of the ASBR A1 and the label allocated by the ASBR A1 (e.g., that are included in the traffic when received by the ASBR A1) to be removed from the traffic.

As shown by reference number 152, the ASBR A1 may send the traffic to the PE A1 (e.g., as a last hop along the LSP to the PE A1). In this way, the PE A1 may receive the traffic from the ASBR A1 (e.g., as a result of the ASBR A1 sending the traffic).

In some implementations, one or more of the ASBR network devices may not support routes that include a composite tunnel attribute. For example, when a first ASBR network device is to re-advertise a route to a second ASBR network device, and the second ASBR network device is not capable of receiving routes with a composite tunnel attribute (or other network devices, of an AS with which the second ASBR network device is associated, are not capable of receiving routes with a composite tunnel attribute), the first ASBR network device may update the route to include a locally allocated label (and to no longer include a composite tunnel attribute) before sending the route (e.g., using an existing inter-AS option). Accordingly, the first ASBR network device may update the data structure (e.g., that is included in, and/or accessible to, the first ASBR network device) to indicate an association with the locally allocated label and the label and the composite tunnel attribute that were included in the route (e.g., in a similar manner as that described elsewhere herein). Accordingly, when the second ASBR network device receives traffic that includes the locally allocated label, the second ASBR network device may update and forward the traffic based on the label and the composite tunnel attribute (e.g., in a similar manner as that described elsewhere herein). In this way, some implementations support advertising routes and routing traffic in association with multiple inter-AS options.

In some implementations, a network device (e.g., a PE network device or an ASBR network device) may advertise that it supports routes that include a composite tunnel attribute. For example, the network device may advertise that it supports routes that include a composite tunnel attribute using a capability code (e.g., that can be included in an BGP capabilities optional parameter, as described in RFC 5492) to other network devices. As another example, the network device may advertise the capability code to an RR, which may re-advertise the capability code to the other network devices. Each network device, based on a received capability code of another network device, then may determine whether the other network device supports routes that include a composite tunnel attribute and may thereby determine how to re-advertise a route to the other network device.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
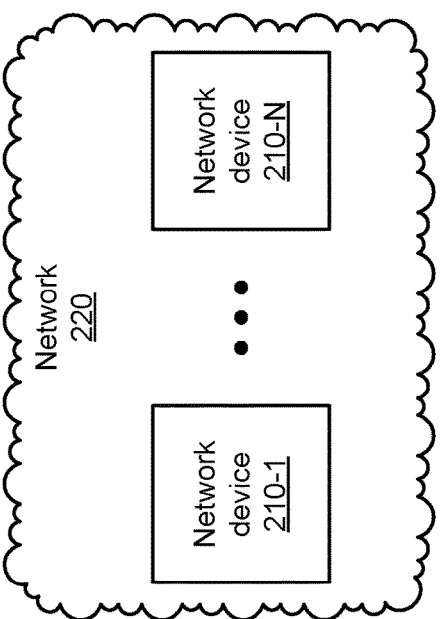
FIG. 2 is a diagram of an example environment in which systems and/or methods described herein may be implemented.
Figure 2:

FIG. 2 is a diagram of an example environment 200 in which systems and/or methods described herein may be implemented. As shown in FIG. 2, environment 200 may a group of network devices 210 (shown as network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing routes and/or traffic in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. Network device 210 may be a PE network device, an ASBR network device, or another type of network device associated with an AS. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. Network 220 may be associated with (e.g., may include) one or more ASs.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
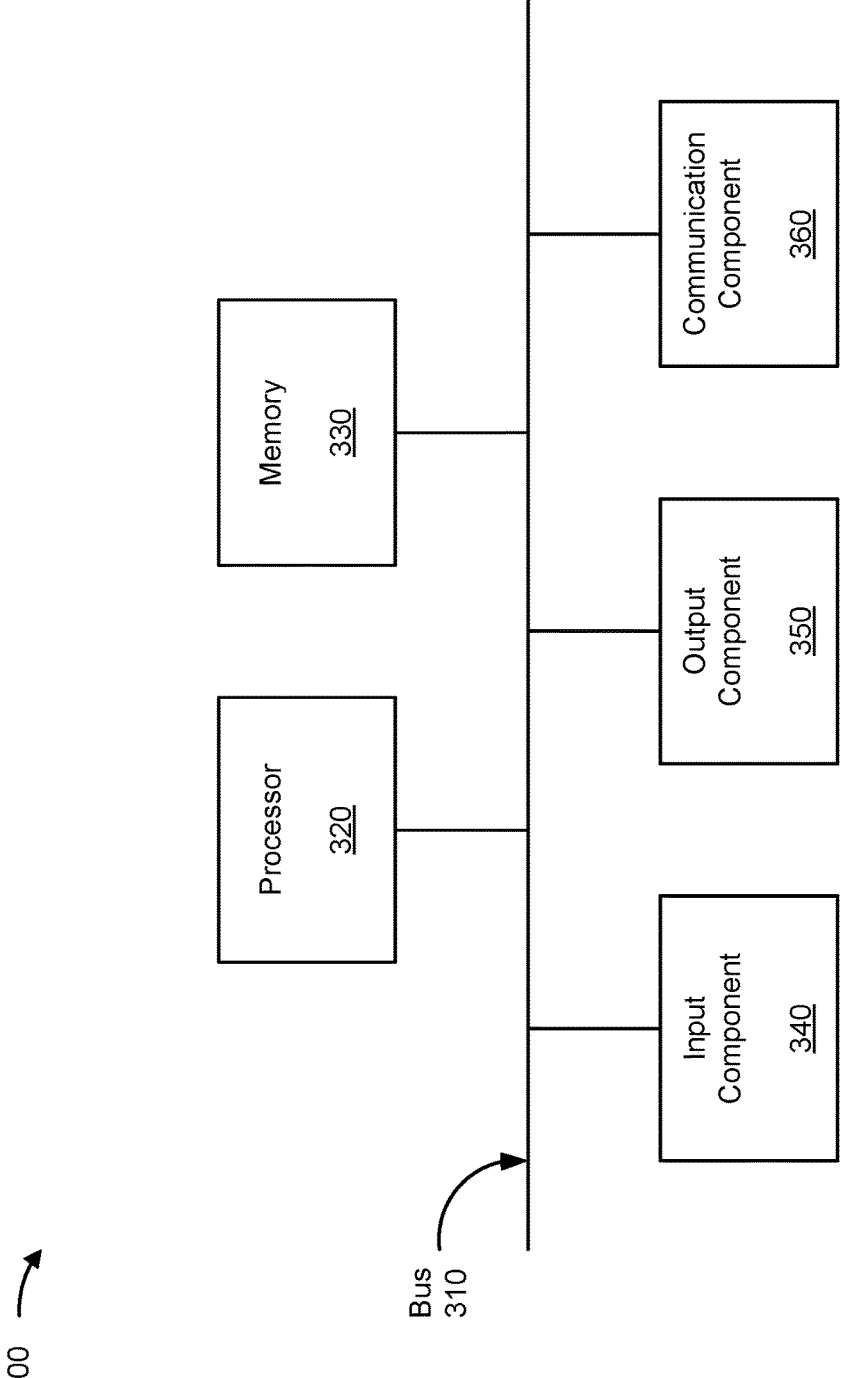
FIG. 3 is a diagram of example components of a device associated with an inter-AS option.

FIG. 3 is a diagram of example components of a device 300 associated with an inter-AS option. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
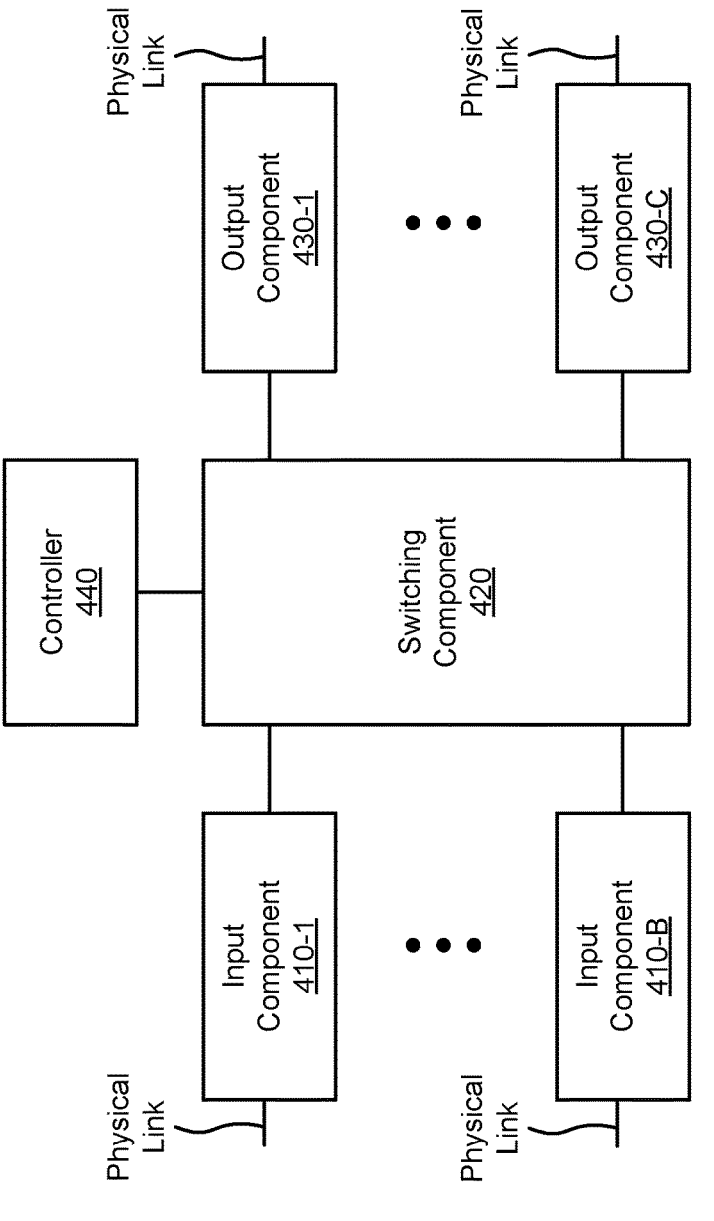
FIG. 4 is a diagram of example components of a device associated with an inter-AS option.

FIG. 4 is a diagram of example components of a device 400 associated with an inter-AS option. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
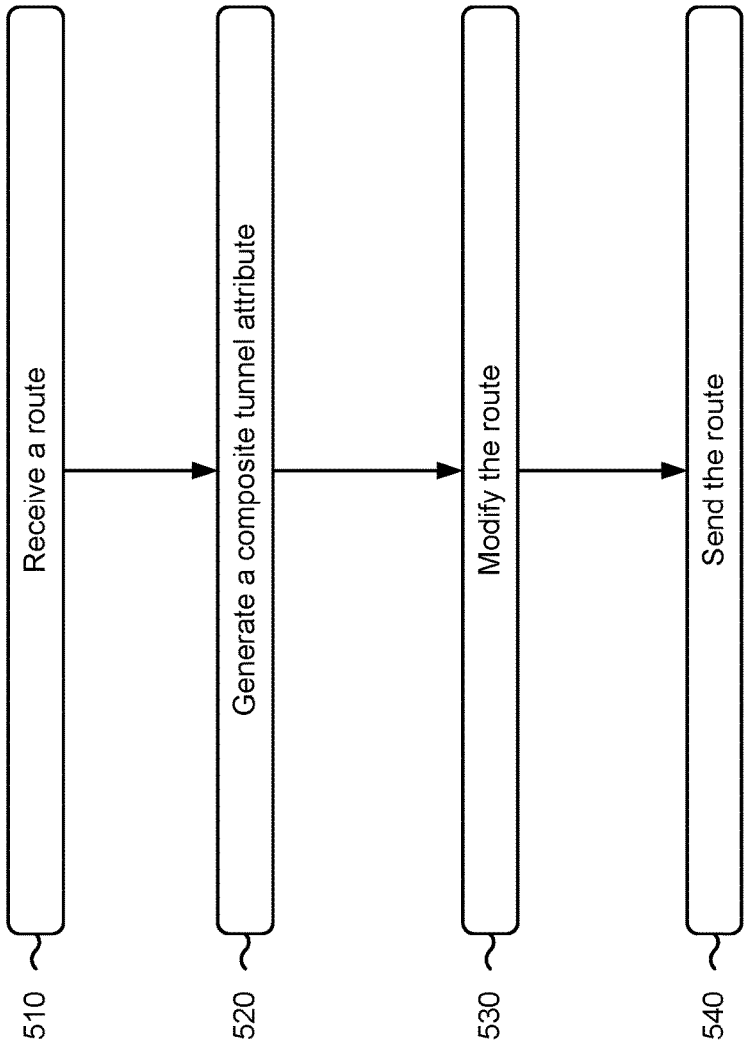
FIG. 5 is a flowchart of an example process associated with an inter-AS option.

FIG. 5 is a flowchart of an example process 500 associated with an inter-AS option. In some implementations, one or more process blocks of FIG. 5 are performed by a network device (e.g., network device 210). In some implementations, one or more process blocks of FIG. 5 are performed by another device or a group of devices separate from or including the network device, such as another network device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include receiving a route (block 510). For example, the network device may receive, from a first other network device, a route, as described above. The route may include a label, a prefix, and a next-hop identifier.

As further shown in FIG. 5, process 500 may include generating a composite tunnel attribute (block 520). For example, the network device may generate, based on receiving the route, a composite tunnel attribute, as described above. The composite tunnel attribute may include an identifier of the network device and a label allocated by the network device.

As further shown in FIG. 5, process 500 may include modifying, the route (block 530). For example, the network device may modify, based on generating the composite tunnel attribute, the route to cause the composite tunnel attribute to be included in the route, as described above.

As further shown in FIG. 5, process 500 may include sending the route (block 540). For example, the network device may send, based on modifying the route, the route to a second other network device, as described above.

Process 500 may include additional implementations, such as any single implementation or any combination of implementations described below and/or in connection with one or more other processes described elsewhere herein.

In a first implementation, the route further includes another composite tunnel attribute when received by the network device, wherein the allocated label is associated with the other composite tunnel attribute; and wherein modifying the route further causes the other composite tunnel attribute to be removed from the route.

In a second implementation, alone or in combination with the first implementation, the route does not include another composite tunnel attribute when received by the network device, wherein the allocated label is associated with the next-hop identifier or a non-composite tunnel.

In a third implementation, alone or in combination with one or more of the first and second implementations, the network device is an ASBR network device, and the first other network device and the second other network device may each be one of a PE network device or another ASBR network device.

In a fourth implementation, alone or in combination with one or more of the first through third implementations, the route does not include another composite tunnel attribute when received by the network device, and process 500 includes creating a forwarding state for the allocated label to enable traffic that includes the allocated label to be tunneled to the next-hop identifier or a non-composite tunnel identifier.

In a fifth implementation, alone or in combination with one or more of the first through fourth implementations, the route does not include another composite tunnel attribute when received by the network device, and process 500 includes receiving, after sending the route to the second other network device, traffic that includes the allocated label; and modifying the traffic to cause the allocated label to be removed from the traffic, and the next-hop identifier, or a non-composite tunnel identifier, to be included in the traffic.

In a sixth implementation, alone or in combination with one or more of the first through fifth implementations, the route further includes another composite tunnel attribute when received by the network device, and process 500 includes creating a forwarding state for the allocated label to enable traffic that includes the allocated label to be tunneled to an egress endpoint of the other composite tunnel attribute.

In a seventh implementation, alone or in combination with one or more of the first through sixth implementations, the route further includes another composite tunnel attribute when received by the network device, and process 500 includes receiving, after sending the route to the second other network device, traffic that includes the allocated label; and modifying the traffic to cause the allocated label to be removed from the traffic, and another label included in the other composite tunnel attribute to be included in the traffic.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device and from a first other network device, a route that includes a label, a prefix, and a next-hop identifier;
   generating, by the network device and based on receiving the route, a composite tunnel attribute that includes an identifier of the network device and a label allocated by the network device;
   modifying, by the network device and based on generating the composite tunnel attribute, the route to cause the composite tunnel attribute to be included in the route;
   sending, by the network device and based on modifying the route, the route to a second other network device; and
   modifying, by the network device, traffic, that includes the allocated label, to cause:
     the allocated label to be removed from the traffic, and
     another label included in another composite tunnel attribute to be included in the traffic.

2. The method of claim 1, wherein the route further includes the other composite tunnel attribute when received by the network device,
   wherein the allocated label is associated with the other composite tunnel attribute; and
   wherein modifying the route further causes the other composite tunnel attribute to be removed from the route.

3. The method of claim 1, wherein the route does not include the other composite tunnel attribute when received by the network device, and
   wherein the allocated label is associated with the next-hop identifier or a non-composite tunnel.

4. The method of claim 1, wherein the network device is an autonomous system border router (ASBR) network device, and the first other network device and the second other network device is a provider edge (PE) network device or another ASBR network device.

5. The method of claim 1, wherein the route does not include the other composite tunnel attribute when received by the network device, and the method further comprising:

creating a forwarding state for the allocated label to enable traffic that includes the allocated label to be tunneled via a non-composite tunnel or to a device identified by the next-hop identifier.

6. The method of claim 5, further comprising:

receiving, after sending the route to the second other network device, the traffic that includes the allocated label; and modifying the traffic to cause:

the allocated label to be removed from the traffic.

7. The method of claim 1, wherein the route further includes the other composite tunnel attribute when received by the network device, and the method further comprising:

creating a forwarding state for the allocated label to enable traffic that includes the allocated label to be tunneled to an egress endpoint of the other composite tunnel attribute.

8. The method of claim 7, further comprising:

receiving, after sending the route to the second other network device, the traffic that includes the allocated label.

9. A non-transitory computer-readable medium storing a set of instructions, the set of instructions comprising:

one or more instructions that, when executed by one or more processors of a network device, cause the network device to:

receive a route that includes a label, a prefix, and a next-hop identifier;

modify, based on receiving the route, the route to cause a composite tunnel attribute to be included in the route, wherein the composite tunnel attribute includes an identifier of the network device and a label allocated by the network device;

send, based on modifying the route, the route to another network device; and modify traffic, that includes the allocated label, to cause:

the allocated label to be removed from the traffic, and another label included in another composite tunnel attribute to be included in the traffic.

10. The non-transitory computer-readable medium of claim 9, wherein the route further includes the other composite tunnel attribute when received by the network device, and wherein modifying the route further causes the other composite tunnel attribute to be removed from the route.

11. The non-transitory computer-readable medium of claim 9, wherein the network device and the other network device are each associated with an autonomous system (AS).

12. The non-transitory computer-readable medium of claim 9, wherein the network device is associated with an autonomous system (AS) and the other network device is associated with another AS.

13. The non-transitory computer-readable medium of claim 9, wherein the one or more instructions further cause the network device to:

create a forwarding state for the allocated label to enable traffic that includes the allocated label to be tunneled via a non-composite tunnel or to a device identified by the next-hop identifier.

14. The non-transitory computer-readable medium of claim 9, wherein the route further includes the other composite tunnel attribute when received by the network device, wherein the one or more instructions further cause the network device to:

create a forwarding state for the allocated label to enable traffic that includes the allocated label to be tunneled to an egress endpoint of the other composite tunnel attribute.

15. The non-transitory computer-readable medium of claim 9, wherein the one or more instructions further cause the network device to:

receive, after sending the route to the other network device, traffic that includes the allocated label.

16. A network device, comprising:

one or more memories; and one or more processors to:

receive, from a first other network device, a route that includes a label, a prefix, and a next-hop identifier;

modify the route to cause a composite tunnel attribute comprising a label allocated by the network device to be included in the route;

send, based on modifying the route, the route to another network device; and modify traffic, that includes the allocated label, to cause:

the allocated label to be removed from the traffic, and another label included in another composite tunnel attribute to be included in the traffic.

17. The network device of claim 16, wherein the route further includes the other composite tunnel attribute when received by the network device, wherein modifying the route further causes the other composite tunnel attribute to be removed from the route.

18. The network device of claim 16, wherein the one or more processors are further to:

create a forwarding state for the allocated label to enable traffic that includes the allocated label to be tunneled via a non-composite tunnel, to a device identified by the next-hop identifier, or to an egress endpoint of the other composite tunnel attribute included in the route.

19. The network device of claim 16, wherein the one or more processors are further to:

receive, after sending the route to the other network device, traffic that includes the allocated label.

20. The network device of claim 16, wherein the network device is associated with an autonomous system (AS) and the other network device is associated with another AS.

* * * * *